United States Patent
Bayen et al.

(10) Patent No.: US 9,407,711 B2
(45) Date of Patent: Aug. 2, 2016

(54) SYSTEMS AND METHODS FOR RECEIVING AND PROCESSING DETECTED EVENTS

(71) Applicant: Facebook, Inc., Menlo Park, CA (US)

(72) Inventors: Zoe Abrams Bayen, Mountain View, CA (US); Jordan William Frank, Seattle, WA (US); Aleksander Gorajek, San Jose, CA (US); William Arthur Hughes, Waterloo (CA); Thomas M. Lento, Menlo Park, CA (US); Itamar Rosenn, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 261 days.

(21) Appl. No.: 14/086,890

(22) Filed: Nov. 21, 2013

(65) Prior Publication Data

US 2015/0142953 A1    May 21, 2015

(51) Int. Cl.
*G06F 15/173* (2006.01)
*H04L 29/08* (2006.01)
*G06F 11/34* (2006.01)

(52) U.S. Cl.
CPC ............... *H04L 67/22* (2013.01); *G06F 11/34* (2013.01)

(58) Field of Classification Search
CPC ........................ H04L 43/08; H04L 43/0876
See application file for complete search history.

(56) References Cited

U.S. PATENT DOCUMENTS

| | | | |
|---|---|---|---|
| 7,669,123 B2 | 2/2010 | Zuckerberg et al. | |
| 8,150,844 B2 | 4/2012 | Redstone et al. | |
| 8,244,848 B1 | 8/2012 | Narayanan et al. | |
| 2007/0294054 A1* | 12/2007 | Mericas | G06F 11/3409 702/186 |
| 2008/0040475 A1 | 2/2008 | Bosworth et al. | |
| 2008/0065604 A1 | 3/2008 | Tiu et al. | |
| 2008/0065701 A1 | 3/2008 | Lindstrom et al. | |
| 2009/0070219 A1 | 3/2009 | D'Angelo et al. | |
| 2009/0119167 A1 | 5/2009 | Kendall et al. | |
| 2011/0004692 A1 | 1/2011 | Occhino et al. | |
| 2011/0083101 A1 | 4/2011 | Sharon et al. | |
| 2012/0072428 A1 | 3/2012 | Kao et al. | |
| 2012/0084160 A1 | 4/2012 | Badros et al. | |
| 2012/0158501 A1 | 6/2012 | Zhang et al. | |
| 2012/0158753 A1 | 6/2012 | He et al. | |
| 2012/0159635 A1 | 6/2012 | He et al. | |
| 2012/0166532 A1 | 6/2012 | Juan et al. | |
| 2012/0197709 A1 | 8/2012 | Kendall et al. | |
| 2012/0203831 A1 | 8/2012 | Schoen et al. | |
| 2012/0221712 A1* | 8/2012 | Sullivan | G06F 11/3476 709/224 |
| 2012/0232998 A1 | 9/2012 | Schoen | |

(Continued)

OTHER PUBLICATIONS

U.S. Appl. No. 13/737,868, filed Jan. 9, 2013.

*Primary Examiner* — Yves Dalencourt
(74) *Attorney, Agent, or Firm* — Sheppard Mullin Richter & Hampton LLP

(57) ABSTRACT

Techniques for receiving and processing detected events are provided. A bit array may be received from a device. Each bit value in the bit array may indicate whether a user initiated event relating to interaction with a website was detected by the device. Data regarding a start time associated with the bit array may be received. Each bit value in the bit array is associated with a time increment after the start time.

19 Claims, 9 Drawing Sheets

(56) References Cited

U.S. PATENT DOCUMENTS

| | | |
|---|---|---|
| 2012/0233009 A1 | 9/2012 | Fougner et al. |
| 2012/0239507 A1 | 9/2012 | Braginsky |
| 2012/0278475 A1 | 11/2012 | Papakipos et al. |
| 2013/0044959 A1 | 2/2013 | Mitchell et al. |
| 2013/0097238 A1 | 4/2013 | Rogers et al. |
| 2013/0159403 A1 | 6/2013 | Zigoris et al. |
| 2014/0067817 A1* | 3/2014 | Seth ............ G06Q 50/01 707/740 |
| 2014/0280880 A1* | 9/2014 | Tellis ............ H04L 41/5009 709/224 |

* cited by examiner

300

|  |  |  |
|---|---|---|
| 301 | Start_time | 377 |
| 302 | Bit_array | 0 ... 0 0 1 0 0 1 1 0 1 |
| 303 | Seq_ID | 17 |
| 304 | Cum_event_time | 217 |
| 305 | Len_events | 4 |
| 306 | User_ID | 1802 |
| 307 | Nav_ID | 11 |

321d → (points to "1" after "0 0")
321c → 
321b → 
321a → (rightmost "1")

|  |  |  |
|---|---|---|
| 401 | From | <script-path>, <product type>, |
| 402 | To | <script-path>, <product type>, |
| 403 | User_ID | 1802 |
| 404 | Nav_ID | 24 |
| 405 | Time | 379 |

FIGURE 4

SYSTEMS AND METHODS FOR RECEIVING AND PROCESSING DETECTED EVENTS

FIELD OF THE INVENTION

The present disclosure relates to the field of monitoring data and, in particular, detecting events relating to user interaction with a computing device.

BACKGROUND

A social networking system may support a website to enable its users, such as persons or organizations, to interact with each other. With input from a user, the social networking system may create and store a user profile associated with the user. The user profile may include demographic information, communication-channel information, information about personal interests, as well as other types of information about a user. The social networking system may also create and store a record of relationships of the user with other users of the social networking system, as well as provide services (e.g. wall posts, photo-sharing, event organization, messaging, games, or advertisements) to facilitate social interaction between or among users.

The social networking system may choose to analyze the interaction of users with a website associated with the social networking system. Such analysis may provide insights regarding actual use of the website and may inform attempts to optimize the design and operation of the website for the benefit of users. For example, if a certain type of content of the website is especially popular with some or all users, then the social networking system may choose to increase the provision of such content to accommodate user preferences. As another example, if a certain type of page of the website garners little attention from users, then the social networking system may choose to reduce or eliminate the instances of such pages in favor of other content deemed more desirable. Optimization of the website in this manner allows the website to foster interaction and communication among users and thereby fulfill its role as a vital social networking resource.

SUMMARY

To receive and process detected events, computer implemented methods, systems, and computer readable media, in an embodiment, may receive a bit array from a device. Each bit value in the bit array may indicate whether a user initiated event relating to interaction with a website was detected by the device. Data regarding a start time associated with the bit array may be received. Each bit value in the bit array is associated with a time increment after the start time.

In an embodiment, a time interval of user attention directed at the website may be determined based on the bit array. The time interval of user attention may include one or more time increments associated with a presence of a detected event.

In an embodiment, wherein the determining of a time interval of user attention may include determining that a predetermined time period after a time increment associated with the presence of a detected event is a part of the time interval of user attention.

In an embodiment, the part of the time interval of user attention may include the one or more time increments associated with an absence of a detected event.

In an embodiment, the predetermined time period may be 30 seconds or less.

In an embodiment, time increments of the bit array may have equal values.

In an embodiment, navigation data may be received from the device. The navigation data may include identifiers of one or more pages of the website accessed during time increments associated with the bit array.

In an embodiment, a time interval of user attention directed at the website may be determined based on the bit array. The time interval of user attention may be associated with the navigation data.

In an embodiment, the associating of the time interval of user attention may include identifying a start time of the time interval of user attention and identifying an end time of the time interval of user attention.

In an embodiment, the associating of the time interval of user attention may include identifying pages accessed during the time interval of user attention.

In an embodiment, the associating of the time interval of user attention may include identifying a type of the device.

In an embodiment, the navigation data may include a first identifier of a first accessed page, a second identifier of a second accessed page, and a time associated with a navigation from the first accessed page to the second accessed page.

In an embodiment, the navigation data may include at least one of a page script or code executed to render a page on the device.

In an embodiment, the event may include a detected JavaScript event.

In an embodiment, the event may include at least one of a detected touch event applied to a touch screen and a detected event regarding content embedded in a page.

In an embodiment, a data packet including the bit array and the start time may be received. The data packet may further include at least one of a sequence identifier, a cumulative time identifier, a length identifier, and an identifier of a user.

In an embodiment, the device may be a mobile device running an application of a social networking system.

In an embodiment, the computer system may include a server associated with a social networking system.

Many other features and embodiments of the invention will be apparent from the accompanying drawings and from the following detailed description.

BRIEF DESCRIPTION OF THE DRAWINGS

FIG. 3 illustrates example data that may be recorded when detecting events, according to an embodiment.

FIG. 4 illustrates example data that may be recorded when detecting navigation data, according to an embodiment.

Figure 1:
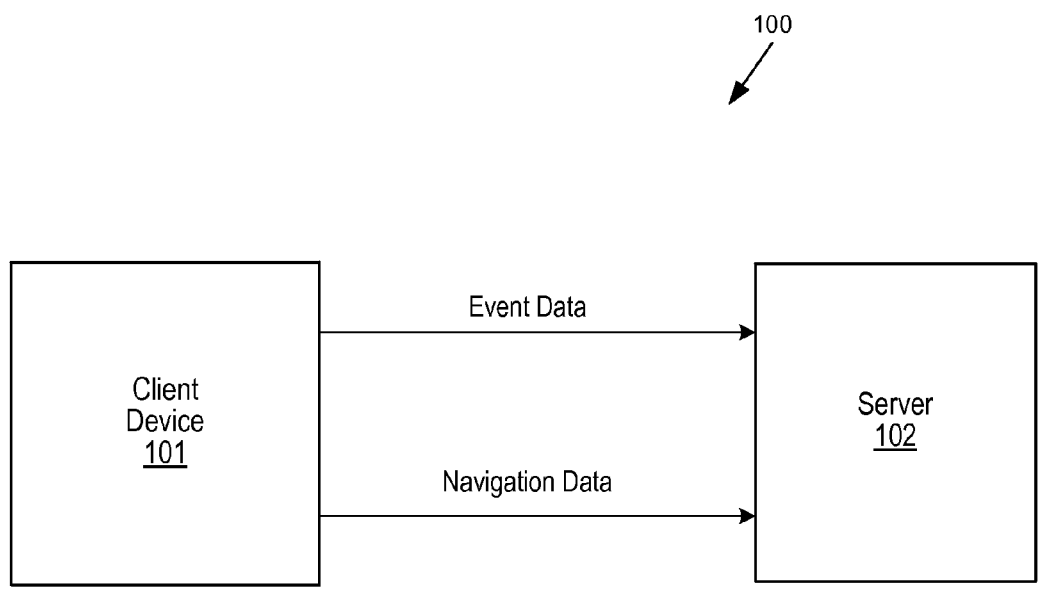
FIG. 1 illustrates an example system for receiving and processing detected events, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Receiving and Processing Detected Events

Measurements regarding user engagement with a website or application may be beneficial for the owner of the website or application. Measurements about user engagement may be obtained and used for a variety of business purposes. For example, user engagement may play a role in how much revenue may be obtained. As another example, user engagement may also factor into product decisions. In this regard, understanding how user engagement differs for users of a website compared to users of a mobile application may affect how a company optimizes the design, development, and operation of products for each platform.

A social networking system is an example of an organization that may own or support a website or application for which user engagement is important. User engagement measurements may relate to how much time users spend on the social networking system's application or website; how the users spend their time when on the application or website; how often users are using the application or website; etc. A social networking system may have a large user base constituting millions and even billions of users. The magnitude of the user base can make the user engagement measurements even more vital to analyzing and optimizing operation of the website or application supported by the social networking system.

Furthermore, user engagement measurements as they relate to different types of platforms may also be important to inform the design, development, and optimization of a social networking application or website. For example, it may be useful to understand how user engagement on a social networking system's mobile application differs from user engagement on the social networking system's website. It may also be useful to understand how user engagement differs between various mobile operating systems, such as Android, iOS, etc.

The more accurately information about user engagement may be determined, the more valuable the information may be. In some instances, user engagement may be detected on a server and based on server requests that are sent to the server by a client device. In such case, the analysis of user engagement is dependent on user actions that result in a server request being sent to the server. However, a user may still be doing things on the social networking system's application or website that do not generate server requests. For example, a user may be reading and scrolling through an article on the social networking system's application or website without generating and sending any server requests. Thus, despite the user's attention being on the social networking system's website or application, a system based on server requests would lack the ability to determine that the user's attention is still on the social networking system's application or website.

Systems and methods of the present disclosure are not limited to such server based requests. The systems and methods described herein involve user engagement measurements that may be obtained by detecting events on the client device and that provide greater detail and granularity as to the user actions. The additional detail and granularity enable more accurate determinations about whether the user's attention is focused on or otherwise engaged with the social networking system's application or website. Such determinations, in turn, may lead to more accurate user engagement metrics to understand and optimize operation of the application or website.

FIG. 1 illustrates an example system for receiving and processing detected events, according to an embodiment. A system 100 includes a client device 101 and a server 102. The client device 101 may be remote from the server 102. The client device 101 may be communicatively coupled to the server 102 through any wired or wireless connection.

The client device 101 may detect events relating to user action on the client device 101. In particular, the detected events relate to user inputs applied to the client device 101 that may indicate or otherwise suggest that a user of the client device 101 is engaged with an application or website on the client device 101. In an embodiment, the application or website may be supported or provided by the same entity that operates the server 102. The detected events may be collected and recorded. As discussed in more detail herein, information about the detected events may be formatted as a data structure, such as a bit array. The information about the detected events then may be sent to the server 102 as event data for further analysis or processing. The client device 101 may also detect navigation data which relates to what the user is doing on the application or website, such as what pages or tabs the user navigates to. The navigation data also may be provided to the server 102.

The server 102 may receive the event data and the navigation data. From the event data, the server 102 may determine intervals of time when it may be inferred that the user's attention is on the application or website (also referred to herein as "intervals of user attention"). As discussed in more detail herein, the server 102 may also combine the navigation data with the event data or the intervals of user attention based on the corresponding times during which they occur.

Figure 2:
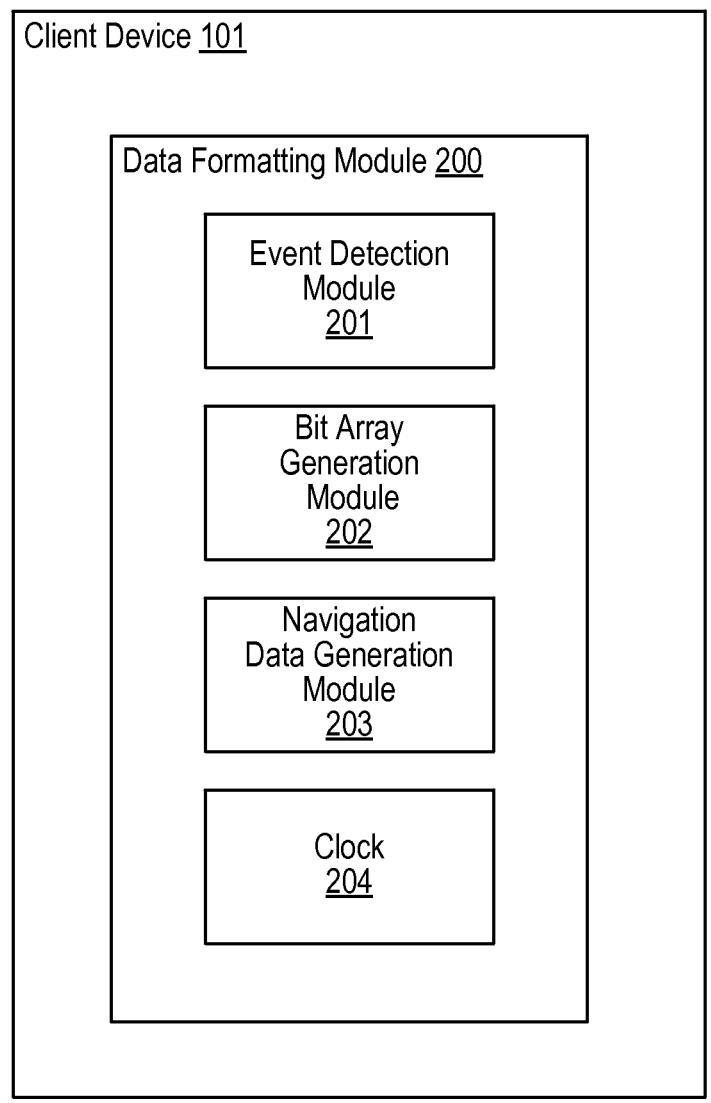
FIG. 2 illustrates an example client device, according to an embodiment.

FIG. 2 illustrates an example client device 101, according to an embodiment. The client device 101 is shown including a data formatting module 200. The data formatting module 200 may collect and record various data as described herein. The data formatting module 200 is shown including an event detection module 201, a bit array generation module 202, a navigation data generation module 203, and a clock 204. The components shown in this figure and all figures herein are exemplary only, and other implementations may include additional, fewer, or different components. Some components may not be shown so as not to obscure relevant details.

The event detection module 201 may detect events that derive from user input applied to the client device 101 and that may indicate that the user is engaged with the application or website. The events that may be detected may include events corresponding to direct user input via the client device 101. For example, an event may include a swipe, scroll, press of a button, movement of a mouse, touch of a touchscreen, etc., by a user interacting with an application or website via the client device 101. As another example, an event may be a user input to scroll a page and a corresponding scrolling event call in accordance with an operating system of the client device 101. The events that may be detected also may include subsequent events that are generated in response to direct user input applied to the client device 101. For example, an event may include responses automatically generated by the application, website, or associated operating system in response to user input. Detecting events at the client device 101, as opposed to detecting events at the server 102 (e.g., detecting server requests at the server 102), enables a more detailed and granular data set which may result in more accurate inferences about whether the user's attention is on the application or website.

The events that are detected by the event detection module 201, and the manner in which they are detected, may vary. In particular, the events may depend on the type of client device 101 and platform on which the client device 101 is implemented. For example, detection of events may vary if the user is accessing a social networking system's website or if the user is accessing a mobile application on a mobile device. Furthermore, the detection of events may vary based on the operating system implemented on the client device 101. Further details regarding these differences are provided herein.

The event detection module 201 may detect JavaScript events. In an embodiment, JavaScript events may be detected when a user accesses the website from the client device 101, such as a desktop computer for example. The event detection module 201 may include a listener for JavaScript events at the root of the Document Object Model (DOM). The JavaScript events may include, but are not limited to, clicks, scrolls, mouse scroll, hovering, mouse over, mouse moves, key presses, etc. Any event related to a user interaction with the client device 101 may be detected. In an embodiment, clicks that may be eliminated on the DOM may be detected before they are eliminated and recorded as an event. It should be appreciated that while JavaScript is used herein as an example, other event-driven programming languages other than JavaScript may be equally applicable. Other event-driven programming language may include, but are not limited to, JScript, ECMAScript, VBScript, Java, etc.

In some instances, one or more JavaScript events may not clearly indicate that the user's attention is on the application or website. For example, a "focus" event may occur when a user clicks on and accesses a page, tab, or window for the application or website. While a user may bring one of the application's pages or tabs into focus, the user may have only done so to type in an unrelated website address in the URL bar and to be taken to the unrelated website. The event detection module 201 may selectively determine whether these or other types of JavaScript events are to be identified and detected by the event detection module 201 for analysis.

In an embodiment, the event detection module 201 may detect events associated with user actions with embedded external content. The embedded external content may include any information, such as a page, form, menu, game, link, image, etc. The embedded external content may or may not be associated with a third party site that is not affiliated with the operator of the server 102. In an embodiment, events within an HTML inline frame element (iFrame) may be detected and recorded by the event detection module 201. In an embodiment, events associated with embedded external content (e.g., events within an iFrame) may not be detected or recorded by the event detection module 201, but mouse moves into or out of the iFrame may be detected and recorded.

The event detection module 201 may detect touch events, such as when a user taps or otherwise interacts with a touchscreen of the client device 101. In an embodiment, the event detection module 201 may detect touch events for a mobile client device 101. Mobile client devices may include smartphones, tablets, pads, etc.

In an embodiment, the event detection module 201 may include a handler that detects touch events. Certain operating systems for mobile devices may include a handler for different types of user events. For instance, the mobile operating system, iOS, may enable a handler to receive certain user events, such as touch events, accelerometer events, etc. In an embodiment, only the touch events are detected by the event detection module 201. In other embodiments, other events (e.g., accelerometer events) also may be detected by the event detection module 201.

In an embodiment, the event detection module 201 may include a throttle for detected events. For example, some user actions may trigger a larger number of events, such as hundreds or thousands of events. Detection of each of these events may burden or slow down system performance. In an embodiment, the throttle may be set such that a reduced set of events may be detected or such that events may not be detected faster than a predetermined frequency. For example, the throttle may be set to collect at most one event per second. In such case, if a user action results in hundreds of events, only one event will be collected per second. Any other suitable frequency other than one event per second may be implemented in other embodiments.

In some instances, an operating system may have multiple threads, such as a background thread and a foreground thread. In an embodiment, after the event is detected and an associated time stamp obtained, subsequent processing is performed in the background thread to reduce any burden on system performance.

In an embodiment, the event detection module 201 may operate in conjunction with an editor to detect events. For example, a mobile operating system (e.g., Android OS) may not enable detection of touch events when a keyboard is activated on the client device 101. The keyboard may be activated when the user is typing inputs to the client device 101. In such case, when a text box and keyboard are activated on the client device 101, the event detection module 201 may detect events by monitoring the editor for any new inputs or changes (e.g., a new letter added, a letter deleted, etc.).

The client device 101 is shown including the clock 204. One or more modules on the client device 101 may utilize the clock 204 for timing purposes. The clock 204 may be used to time stamp (or mark) the occurrence of a detected event or a related user action (e.g., navigation from one page to another). In an embodiment, the clock 204 may be implemented by the operating system of the client device 101 or an application running on the client device 101.

The bit array generation module 202 may generate bit arrays that indicate the detection of events. When the event detection module 201 detects an event, a message may be generated and sent to the bit array generation module 202. The bit array generation module 202 may then record a bit value of "1" at the corresponding time in a bit array. When no event is detected, the bit array generation module 202 may record a bit value of "0" at the corresponding time in the bit array. In another embodiment, other values may be used to indicate a detected event or the absence of a detected event.

When the bit array is full, the bit array generation module 202 may transmit the bit array to the server 102. In an embodiment, additional information may be included with the bit array and sent to the server 102, as described herein. In some instances, the bit array and additional information may be formatted and sent immediately to a queue for transmission to the server 102. In some instances, the bit array and additional information may be formatted and stored for transmission to the server 102 at a later time.

The bit array generation module 202 may record a sequence of "1"s and "0"s at predetermined time increments. Each bit value of "1" or "0" may represent either a detection or non-detection of an event, respectively, at that corresponding consecutive time increment. In one embodiment, the time increment may be one second. In such case, at every second, the bit array generation module 202 may record either a bit value of "1" or "0" depending on whether the event detection module 201 detects or does not detect an event, respectively. In other embodiments, the time increment may be 2 seconds, 3 seconds, 5 seconds, or any other suitable time increment.

The size of the bit array may vary in different embodiments. In one embodiment, the bit array may include a sequence of 64 bits. In other embodiments, the bit array may include a sequence of 32 bits, 128 bits, 256 bits, or any other suitable number of bits.

In an embodiment, additional data may be included along with the bit array and provided to the server 102. For example, the bit array generation module 202 may generate a data packet containing the bit array as well as the additional data. The data packet may include, for example, a start time of the bit array corresponding to the time of the first bit of the sequence within the bit array. The bit array generation module 202 may record the start time of the bit array based on the time provided by the clock 204. In an embodiment, each bit array may begin with the detection of an event. In such case, the start time of the bit array corresponds to the time that the first event was detected. Each bit value of "1" or 0 represents either a detection or non-detection of an event, respectively, at that corresponding time increment from the start time.

The data packet may include a sequence identifier which identifies a bit array in a sequence of bit arrays. For example, a first bit array may have a sequence identifier of "1", a second bit array may have a sequence identifier of "2", a third bit array may have a sequence identifier of "3", and so on for the remainder of bit arrays in the sequence.

The data packet may include a cumulative time identifier which indicates the cumulative time of detected events that are reflected in a sequence of bit arrays generated so far. For example, if two bit arrays have been generated with one bit array having eight detected events and the other bit array having six detected events, then the cumulative time identifier would reflect fourteen seconds if the time increment of each bit is one second.

The data packet may include a length identifier which indicates the total length of time of detected events within the bit array. For example, if the time increment of a bit array is one second, then the length identifier may have a value equal to the number of bit values of "1" within the specific bit array.

The data packet may include an identifier of the user (e.g., user ID) that is using the client device 101 to access the application or website.

The data packet may include one or more identifiers of the user's navigation of the application or site. For example, a page ID or a tab ID may be used to identify which page or tab was accessed. In an embodiment, a randomly generated number may be used to identify the page or tab. Multiple identifiers may be used to identify multiple tabs that may be opened within a page. An identifier may identify which of the multiple tabs was accessed. In an embodiment, an identifier may identify which page or tab was navigated to or from. In an embodiment, the path script or code executed to render a page may be included in the data packet to provide more granular details as to what the user was doing on the application or website.

The data packet may include an identifier for the type of client device 101 and platform on which the client device 101 is implemented. The data packet may also include an identifier for a version of the platform that is implemented.

The navigation data generation module 203 may detect navigation data related to user action with the application or website. The navigation data may reflect, for example, the pages or tabs to which the user has navigated. Navigation data may include one or more identifiers of the user's navigation of the application or website. For example, a page ID or a tab ID may be used to identify which page or tab (of multiple tabs) associated with the application or website was accessed during the user navigation. In an embodiment, a randomly generated number may be used to identify the page or tab. Multiple identifiers may be used to identify multiple tabs that may be opened within a page. In an embodiment, an identifier may identify which page or tab was navigated to or from. In an embodiment, the path script or code executed to render a page may be included in the data packet to provide more granular details as to what the user was doing on the application or website.

A page to or from which a user has navigated may include pages from a social networking system. Example social networking pages may include, but are not limited to, a "newsfeed" page for user posts or activities, a "games" page for user playable games, "photos" or "videos" pages of user images or videos, a "timeline" page related to historical user activities, or any other type of page that may be implemented within the application or website of the social networking system.

One or more of the pages may be a tabbed page. For example, a graphical user interface of an application or website may include multiple tabbed pages but only display one of the tabbed pages at a time. To switch to a tabbed page not shown, a user may select (e.g., click on) the corresponding tab of the tabbed page. The navigation data may identify the tabbed page that was selected and accessed. Further, a page may include one or more tabbed subpages. For example, a "photos" page may include a tabbed subpage for "photos of the user" and another tabbed subpage for "photo albums of the users. Likewise, the navigation data may identify the selection of tabs of subpages using associated identifiers.

The navigation data may identify the pages or tabs that correspond to the starting and ending of user navigation through an application or website. In some instances, the navigation data may include a single transition from one page or tab to the next. In some instances, the navigation data may include a series of transitions between three or more pages or tabs.

The navigation data may also include timing data. The timing data may include a time stamp (or marker) indicating the time the user navigates to a page or tab. The timing data may include the time the user navigates away from a page or tab. For example, the navigation data generation module 203 may generate a time stamp based on the time provided by the clock 204.

The navigation data generation module 203 may record the navigation data and transmit it to the server 102. In an embodiment, the navigation data may be sent to the server 102 separate from the event data including the bit arrays. In another embodiment, the navigation data may be sent with, or otherwise combined with, the event data including the bit arrays. In another embodiment, one or more of certain types of navigation data may be included with the bit array. The navigation data may be combined with the bit array within the same data packet.

The navigation data may include information identifying navigation from an origin (e.g., page or tab) to a destination (e.g., page or tab). The navigation data for the origin or destination may include, for example, a script-path, product type (e.g., a newsfeed, a timeline, etc.), or combination thereof. The navigation data may include additional information to facilitate the linking of the navigation data to the event data including the bit arrays. This navigation data may include, for example, a user ID for the user navigating the application or website, a time corresponding to the time of the transition from the origin page to the destination page, page IDs or tab IDs associated with the origin or destination, etc.

The navigation data may include an identifier for the type of client device 101 and platform on which the client device 101 is implemented. The navigation data may also include an identifier for a version of the platform that is implemented.

FIG. 3 illustrates an example table of data that may be recorded when detecting events on a client device for transmission to the server, according to an embodiment. A table 300 includes a start time identifier 301 and a bit array 302. The start time identifier 301 identifies the start time corresponding to the time of a first bit 321$a$ within the bit array. In the example shown, a bit is recorded every second and the start time is at the 377th second. At the start time corresponding to the 377th second, the first bit 321$a$ of the sequence within the bit array is a "1", indicating that an event was detected at the start time. A second bit 321$b$ within the bit array is a "0", indicating that no event was detected at a time corresponding to the 378th second. A third bit 321$c$ within the bit array is a "1", indicating that an event was detected at a time corresponding to the 379th second. The same analysis may be applied to the remaining bits of the bit array. If the bit array includes 64 bits, for instance, then the bit array would reflect 64 seconds of data.

A sequence identifier 303, labeled as "Seq_ID", identifies the bit array in a sequence of bit arrays that may be recorded and sent to the server. In the example shown, the bit array 302 is the 17th bit array that has been generated in the sequence.

A cumulative time identifier 304, labeled as "Cum_event_time", identifies the cumulative time of detected events (e.g., the time associated with the total number of "1"s) reflected in a sequence of bit arrays generated so far. In the example shown, 217 bit values of 1 are reflected within all of the bit arrays of the sequence generated so far. For a time increment of 1 second, this indicates that 217 seconds of detected events are reflected in all of the bit arrays so far. In another embodiment, a cumulative time identifier may be implemented that identifies the cumulative time for all intervals of user attention of the sequence of bit arrays generated so far. This identifier may be implemented in addition to, or in place of, the cumulative time identifier 304.

A length identifier 305, labeled as "Len_events", indicates the total length of time of detected events within the bit array. In the example shown, 4 bits of the 64 bit array represents 4 seconds of detected events. In another embodiment, the length identifier 305 may indicate the total length of time for an interval of user attention. For instance, the user attention may begin at the 377th second with first bit 321$a$ and ends at the 383th second with bit 321$d$. In another embodiment, a cumulative time identifier may be implemented that identifies the total length of time for all intervals of user attention within the bit array. This identifier may be implemented in addition to, or in place of, the length identifier 305.

An identifier 306, labeled "User_ID", identifies the user to whom the bit array applies. In the example shown, the identifier 306 identifies the user with user ID 1802.

A navigation data identifier 307, labeled "Nav_ID", identifies which page or tab was accessed. In the example shown, the navigation data identifier 307 indicates that the page identified by number "11" was accessed.

FIG. 4 illustrates an example table of data that may be recorded when detecting navigation data, according to an embodiment. A table 400 includes data for recording a transition from an origin to a destination during user navigation. Origin data 401 includes information related to an original page. The origin data 401 may include a script path, product type, or combination thereof. It should be appreciated that the actual script path or product type may be recorded. Destination data 402 includes information related to a destination page. The destination data 402 may include a script path, product type, or combination thereof. The origin data 401 or destination data may include program code that was executed to render a page. This data may be used to provide more detailed granularity as to what the user was doing on the application or website during the interval of user attention. For example, in addition to identifying that the user had a "photos" page open, the script path or code executed may provide more nuanced information such as whether the user was viewing an album, editing an album, tagging a user within a photo, etc. The table 400 may also include an identifier 403 that identifies the user who is navigating the application or website. The table 400 may also include a navigation data identifier 404 that identifies the page that was accessed. The table 400 may also include a time 405 that indicates when the user navigated from the original page to the destination page.

The type of navigation data that is recorded may vary based on the client device and what operating system is being used. In some instances, a client device may have limited capabilities or functionality. For example, certain conventional mobile phones may not support JavaScript functionality, or may lack the capability to record navigation data or send navigation to the server. In an embodiment, for such conventional mobile phones, server requests may be monitored on the server side to detect events on the mobile phones.

Figure 5:
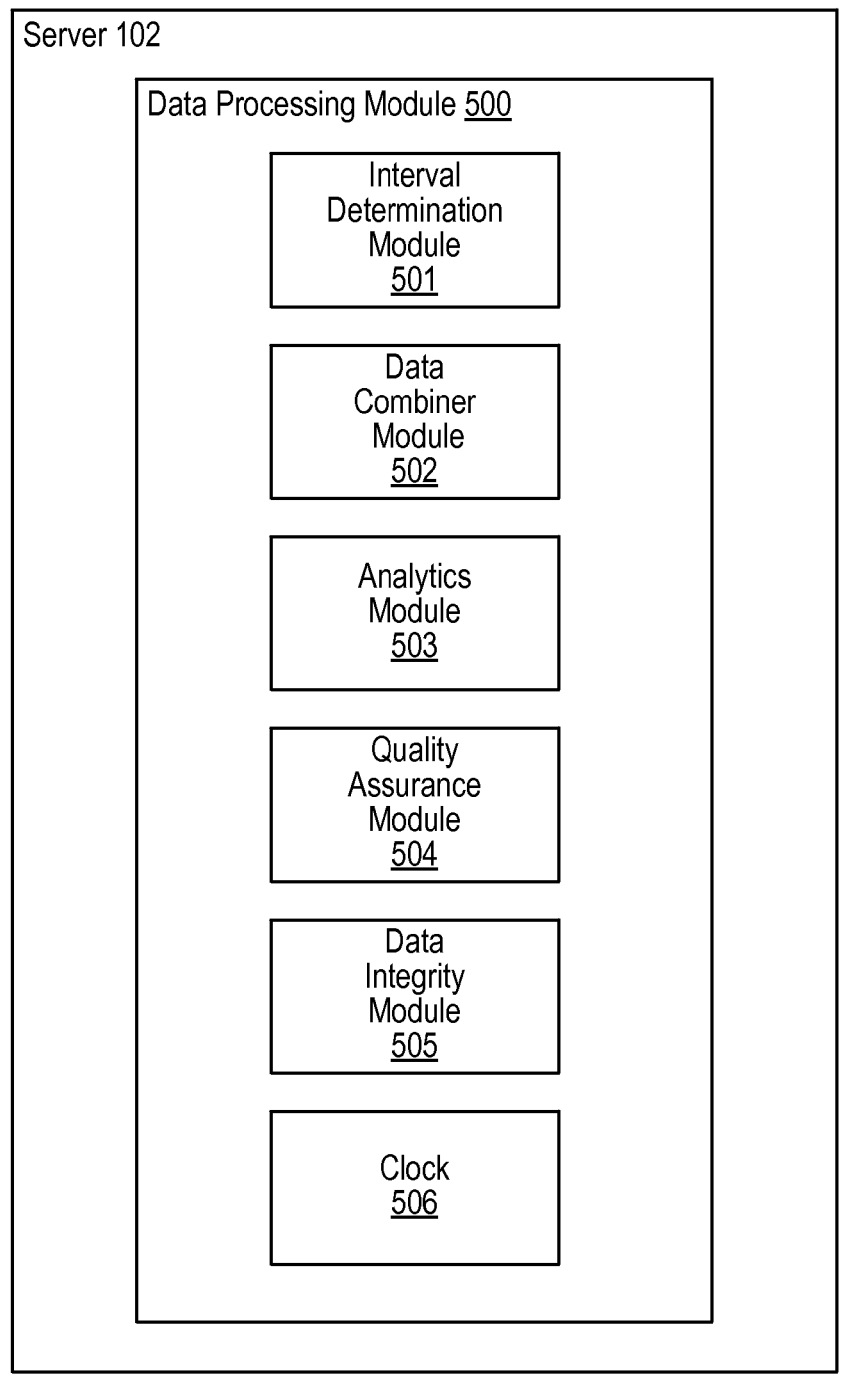
FIG. 5 illustrates an example server, according to an embodiment.

FIG. 5 illustrates an example server 102, according to an embodiment. The server 102 includes a data processing module 500. The data processing module 500 receives event data and navigation data from the client device 101 and further processes the data as described herein. The data processing module 500 is shown including an interval determination module 501, a data combiner module 502, an analytics module 503, a quality assurance module 504, a data integrity module 505, and a clock 506.

The interval determination module 501 may receive the bit array and may determine the intervals of user attention. The intervals of user attention may be determined based on the detected events within the bit array. For instance, for times when an event is detected, it may be determined that the user is paying attention to the application or website. In some instances, however, the user may be paying attention to the application or website but no event is detected. For example, if the user is reading or otherwise consuming content of the application or website, no event may be detected but the user's attention is still on the application or website.

A policy (or rule) may be implemented which considers a user to be paying attention to the application or website for a predetermined time period after an event is detected, even there is an absence of detected events during the predetermined time period (e.g., bit values of 0). The predetermined time period may be 5 seconds, 15 seconds, 30 seconds, 1 minute, or any other suitable amount of time. In an embodiment, the predetermined time period may be 30 seconds or less. For example, if the predetermined time period is 30 seconds, then the interval of user attention would encompass 30 seconds after an event is detected. If a subsequent event is detected before the 30 seconds has expired, then the interval of user attention is further extended 30 seconds after the subsequent event. If, however, no subsequent event occurs during the 30 seconds, then the interval of user attention ends at the end of the 30 seconds. In another embodiment, if no subsequent event occurs during the seconds, then the interval of user attention ends at the time of the last detected event. In this way, intervals of user attention may include time periods between two consecutive detected events that are less than the predetermined time period (e.g., 30 seconds), but may end immediately after a last detected event (i.e., an event that is not followed by an additional detected event within the predetermined time period).

The interval determination module 501 determines the intervals of user attention for the time represented by the bit array. The interval determination module 501 may record the start time and end time of each interval. In another embodiment, the interval determination module 501 may also record the intervals of no user attention within the time represented by the bit array.

The data combiner module 502 receives the navigation data and combines it with the event data and the intervals of user attention. The data combiner module 502 may use time stamps to synchronize the data. For example, the data combiner module 502 may identify the start and end times of the intervals of user attention from the event data, and then record the corresponding navigation data that falls within those intervals of time. In this way, each interval may be associated with corresponding navigation data.

The analytics module 503 may receive the combined data for the intervals of user attention and generate various analytics based on the combined data. In an embodiment, the analytics module 503 may be implemented on a computer system in communication with the server 102.

The combined data may be used for a wide range of analytical processing performed by the analytics module 503. Such analytical processing may concern a variety of considerations including, but not limited to, how much time users spend on the application or website, how they spend their time (e.g., on which pages or tabs), how long they spend on different pages or tabs, what users do when on various pages or tabs, where users navigate and how frequently they visit a page or tab, what time users use the application or visit a particular page, the rate of user interaction for different pages, or any other information relating to use of the application or website. Furthermore, each of these considerations may also be evaluated for different client devices and corresponding operating systems. For example, the rate of user interaction may be different for users accessing the website from a desktop computer compared to when accessing an application or website via a mobile device.

The quality assurance module 504 may perform various quality assurance analyses on some or all of the event data, navigation data, or combined data. In an embodiment, the quality assurance module 504 may receive the event data, navigation data, or combined data in parallel with receipt of the combined data by the analytics module 503.

The quality assurance module 504 may identify one or more cumulative counters, such as the sequence identifier 303 and the cumulative time identifier 304. These cumulative counters may be used to determine whether any data is dropped, missing, or otherwise not received by the server 102. For example, the sequence identifier 303 may be used to determine the cumulative number of bit arrays that were sent. The cumulative time identifier 304 may be used to determine the cumulative time of detected events (e.g., the time associated with the total number of "1"s) that has been reflected in the total sequence of bit arrays that have been generated. From this information, the total number of missing arrays or the total missing time may then be determined.

The quality assurance module 504 may also use any of the data from the event data, navigation data, or combined data to perform various other quality assurance analyses. For example, when a new version of an application is implemented and the quality assurance module 504 determines that a significant amount of data is missing, then the source of the problem may be investigated for correction. In an embodiment, an alert may be triggered by the quality assurance module 504 when a metric indicates that the amount of data missing exceeds a predetermined threshold.

In some instances, when a new version of an application is to be released for a mobile client device, the application may be released to a limited sample group of users. In an embodiment, aggregate metrics (e.g., metrics for missing arrays or time) for the new version may be determined by the quality assurance module 504 and compared to aggregate metrics for one or more pre-existing versions of the mobile client that have been in production. Each bit array reflecting user action that is provided to the server 102 may be accompanied with an identifier to indicate use of either the new version or the pre-existing version. The identifier of the version allows the server 102 to distinguish between the versions. If the aggregate metrics for the new version differ widely from the aggregate metrics for the other versions in production, then an alert may be triggered by the quality assurance module 504 to prompt further investigation.

Subsequent processing for quality assurance purposes may include ordering the bit arrays received according to their sequence identifier. In this way, each missing array, and the total number of arrays missing, may be identified.

Any overlapping bit arrays or bit arrays that are out of order in time may indicate potential quality assurance issues. Overlapping arrays or arrays that are out of order in time may, for instance, indicate a problem with or change to a clock. Although the arrays are ordered in sequence, the arrays are not necessarily ordered by time. Since the length of an array is known, along with the start time of each array, any overlapping arrays or arrays that are out of order in time may be identified. For example, if the end of an array is later than the start of the next array, then there are two overlapping arrays that exist at the same time. In an embodiment, if the number of instances of overlapping arrays, or arrays that are out of order in time, exceeds a predetermined threshold value, then an alert may be triggered by the quality assurance module 504 and the issue investigated.

The total cumulative time may also be analyzed to determine if a potential quality assurance issue exists. An excessively high cumulative time may indicate that the clock on the client device 101 is faulty or inaccurate. For instance, if the total cumulative time indicates a value such as 4 years, then it may be determined that a problem exists.

The quality assurance module 504 may also provide a visual interface tool that may assist an operator (or analyst) with determinations about quality assurance. The visual interface tool may also assist an operator to better understand or interpret analytical processing on event data and navigation data. The visual interface tool in real time or near real time may visually display the receipt and logging of such data as a user interacts with the application or website via the client device 101. Furthermore, the visual interface tool may provide automated error reporting features to assist with verification and validation of the data.

The visual interface tool may enable an operator to view data related to a user accessing the application or website from a client device 101. The visual interface may display the detection of events that are recorded on the client device 101. In an embodiment, the visual interface may include a timeline where the detected events are visually indicated at the corresponding time on the timeline. In an embodiment, the timeline may be a moving timeline that shifts with the passage of time.

The event data received by the server 101 may be visually indicated on the timeline at the corresponding time of the event detection. In this way, the detected event on the client device 101 and the associated event data received at the server 102 are independently shown on the timeline but should align with each other on the timeline. The interval of user attention may also be displayed at the corresponding time on the timeline. Multiple intervals of user attention that are determined according to different policies may be displayed simultaneously at the corresponding time on the timeline. The visual interface may display data for more than one type of client device (e.g., mobile device with iOS, mobile device with Android OS, website access on a desktop computer, etc.), as well as identify the type of the client device and type of the operating system in use. The visual interface tool may also indicate what pages (or subpages) or tabs has been accessed by the user during navigation. Any information regarding event data and navigation data may be selectively displayed by the visual interface tool.

The visual interface tool may also permit the operator to prepare a report of data regarding user attention. The report may include any additional detail as to event data and navigation data. The report may also include information about trends, version performance, errors, operator comments, etc.

The data integrity module 505 may remove any data that appears to be faulty, defective, or duplicative. In an embodiment, the determination of faulty, defective, or duplicative data may be facilitated or performed by the quality assurance module 504. For example, the data integrity module 505 may remove data associated with time stamps that are inaccurate, data associated with sequence numbers that are high or negative, data associated with bit array lengths that are incorrect, etc. In an embodiment, the data integrity module 505 may remove data only if the data satisfies a threshold or standard relating to an extent to which the data may be faulty, defective, duplicative, or otherwise incorrect. In an embodiment, incorrect data may be removed before being sent to the analytics module 503.

The clock 506 may provide time information for the server 102. The clock 506 and the clock 204 may not necessarily be in sync with one another. In an embodiment, all the recorded times for the navigation data and data including the bit array are based on the clock 204 of the client device 101. These times may not be converted to the time of the clock 506 of the server 102. The recorded times may be maintained in terms of the clock 204. In another embodiment, the recorded times are converted to the time of the clock 506. In this way, if there is any discrepancy with the time on the clock 204, then the discrepancy may be corrected during conversion of the time. In an embodiment, the conversion of time from the clock 204 to the clock 506 may take into account any latency or lag times that may occur from the transmission of the data from the client device 101 to the server 102. For example, the time the data is sent from the client device 101 may be recorded along with the time that the data is received at the server 102. The latency may be determined based on the difference between the time the data was sent and the time it was received. The difference may be calculated a number of times and averaged to minimize the influence of any outlier values of latency.

Figure 6:
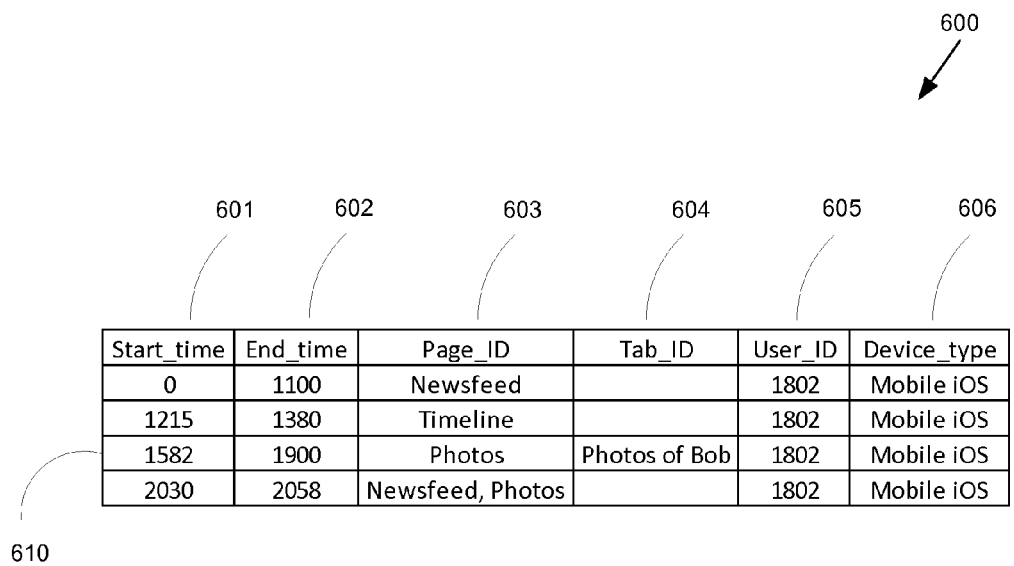
FIG. 6 illustrates example data where navigation data has been combined with the intervals of user attention, according to an embodiment.

FIG. 6 illustrates an example table of navigation data combined with the intervals of user attention, according to an embodiment. Each row of table 600 represents an interval of user attention. Columns 601 and 602 indicate the start time and the end time, respectively, of each interval. Column 603 indicates pages that were accessed by the user between the start time and the end time. Column 604 indicates any tabs that the user selected between the start time and the end time. Column 605 indicates the user ID for the user that is navigating the application or website. Column 606 indicates the type of client device that the user is operating, such as device category (e.g., mobile device, desktop computer, etc.), operating system, browser, etc. For example, row 610 represents one interval of user attention that begins at time 1582 and ends at time 1900. During that time, the "Photos" page was accessed on the client device and the "Photos of Bob" tabbed subpage was accessed. The user navigating the website has user ID 1802 and is operating a mobile device having the iOS operating system. The example data reflected in the table may be used by a social networking system to better monitor and understand user interaction with an application or website associated with the social networking system. Appropriate optimizations may be performed based on this monitoring and understanding.

It should be appreciated that the data shown is exemplary. Other embodiments may include more or less navigation data than shown for each interval of user attention. The data collected may vary in granularity in different embodiments. For example, the data for the page type may be a page identifier that provides a high level identification of the page type, such as newsfeed, photos, timeline, etc. In an embodiment, the data for the page type may include more detailed information beyond what page is accessed. For example, the data for the page type may include a script path, or program code that was executed to render a page, which may identify more specific information as to what the user was doing on the application or website during the interval of user attention.

Figure 7:
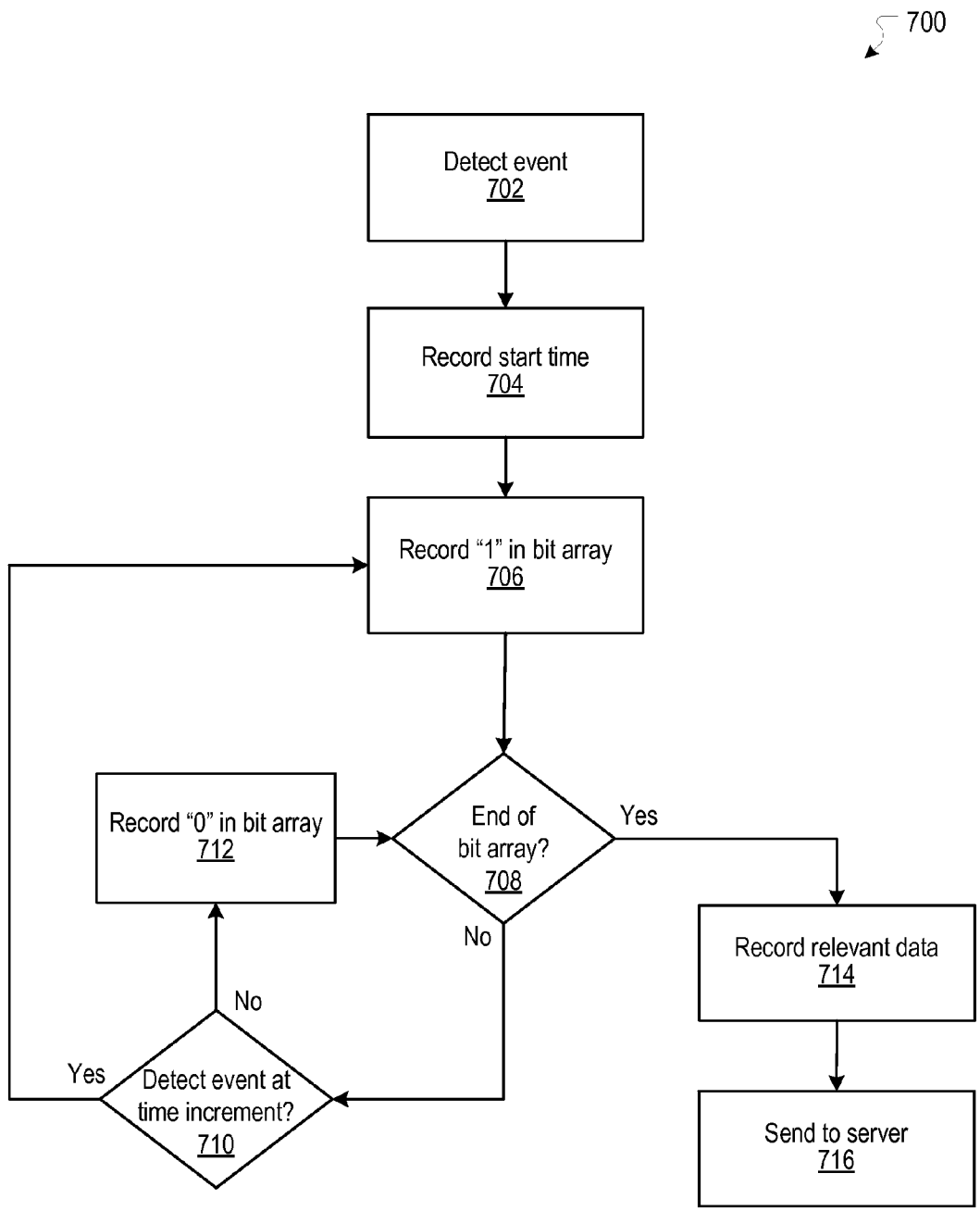
FIG. 7 illustrates an example process of generating event data including a bit array based on detected events, according to an embodiment.

FIG. 7 illustrates an example process of generating event data including a bit array based on detected events, according to an embodiment. It should be appreciated that the discussion above for FIGS. 1-3 may also apply to the process for FIG. 7. For the sake of brevity and clarity, every feature and function applicable to FIG. 7 is not repeated here.

At block 702 of process 700, an event is detected. The detected event may derive from user input applied to the client device 101 and may indicate that the user is engaged with the application or website. The detected events may include any user interaction with the application or website. For example, the detected events may include user-initiated events, such as touch events applied to a touch screen of a client device 101, events monitored by an event-driven programming language such as JavaScript, events reflecting changes applied to an editor of the client device 101, etc. Other detected events are possible, as described herein. In an embodiment, block 702 may be performed by the event detection module 201 of FIG. 2.

At block 704, the time corresponding to the detected event is recorded as the start time of the bit array. At block 706, a bit value of "1" is recorded in the bit array. In an embodiment, blocks 704 and 706 may be performed by the bit array generation module 202 of FIG. 2. The bit array generation module 202 may record the start time of the bit array based on the time provided by the clock 204 of FIG. 2.

At block 708, it is determined if the bit array is complete. The determination may be based on the selection of a size for the bit array. If the bit array is not complete, then at block 710 it is determined if an event is detected at the next time increment. If an event is detected at the next time increment at block 710, then at block 706 a bit value of "1" is recorded in the bit array. Another determination may then be made at block 708 as to whether the bit array is complete. In an embodiment, block 710 may be performed by the event detection module 201 of FIG. 2.

If an event is not detected at the next time increment at block 710, then at block 712 a bit value of "0" is recorded in the bit array. Another determination may then be made at block 708 as to whether the bit array is complete. In an embodiment, block 712 may be performed by the bit array generation module 202 of FIG. 2.

If at block 708 it is determined that a bit array is complete, then at block 714 any relevant data is recorded. For example, a data packet may be generated to include the bit array, the start time, a sequence identifier which identifies a bit array in a sequence of bit arrays, a cumulative time identifier which identifies the cumulative time of detected events that are reflected in a sequence of bit arrays generated so far, a length identifier which indicates the total length of time of detected events within the bit array, an identifier of the user, one or more identifiers of the user's navigation of the application or website, etc. In an embodiment, block 714 may be performed by the bit array generation module 202 of FIG. 2.

At block 716, the start time, bit array, and any additional relevant data may be sent to the server 102 for further processing or analysis.

Figure 8:
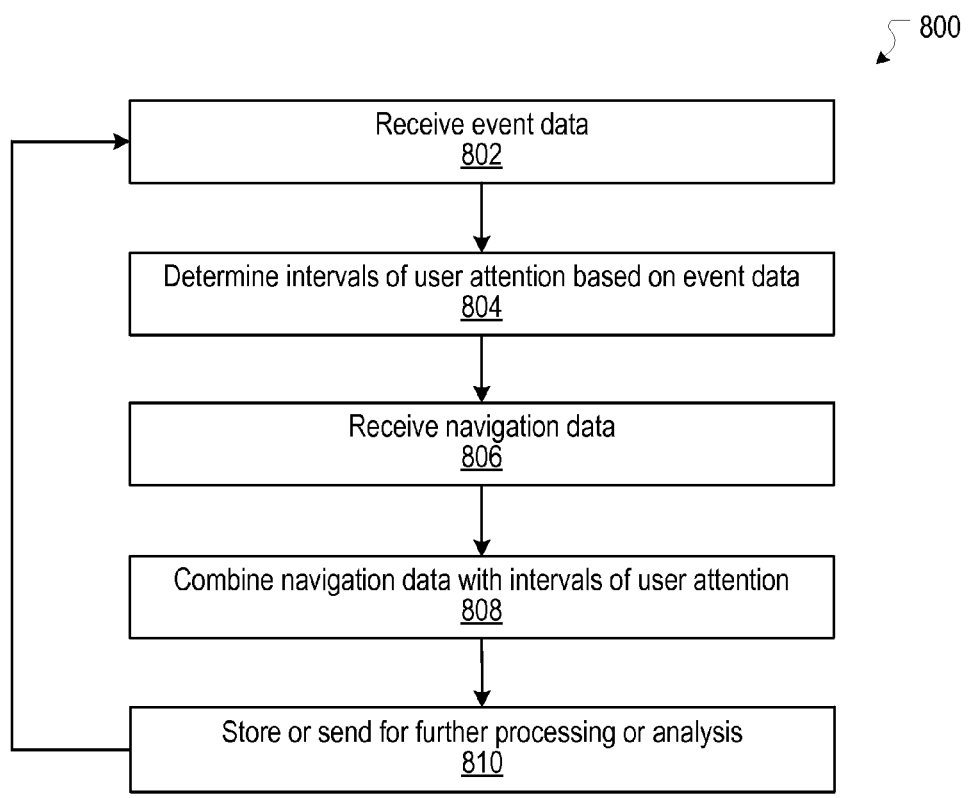
FIG. 8 illustrates an example process of combining navigation data with intervals of user attention, according to an embodiment.

FIG. 8 illustrates an example process of combining navigation data with intervals of user attention, according to an embodiment. It should be appreciated that the discussion above for FIGS. 1-7 may also apply to the process for FIG. 8. For the sake of brevity and clarity, every feature and function applicable to FIG. 8 is not repeated here.

At block 802 of process 800, event data is received at server 102 from the client device 101. The event data may include the bit array based on detected events on the client device 101. The detected events may include events resulting from user interaction with an application or website of a social networking system via the client device 101.

The event data may also include additional data, such as a start time for the first bit in the bit array, a sequence ID for identifying the bit array in a sequence of bit arrays, a user ID identifying the user navigating the application or website, cumulative counters of detected events reflected within the bit array or sequence of bit arrays, etc.

The bit array may include consecutive bits of "1"s or "0"s which represent either a detection or non-detection of an event, respectively, at a corresponding time increment from the start time. The detected event may include any event, as described herein.

At block 804, intervals of user attention may be determined based on the detected events reflected within the bit array. In an embodiment, a policy may be implemented which considers a user to be paying attention to the application or website for a predetermined time period after an event is detected, even when there is an absence of detected events during the predetermined time period (e.g., bit values of j). In an embodiment, blocks 802 and 804 may be performed by the interval determination module 501 of FIG. 5.

At block 806, navigation data is received at the server 102 from the client device 101. The navigation data may relate to what the user is doing on the application or website, such as what pages or tabs the user navigates to and accesses, what times the transitions from one page to another occur, etc. For example, the navigation data may include identification of a transition from one page or tab to another page or tab. The navigation data may include identifiers for the first page accessed and the subsequent page accessed, along with a time stamp for the time of transition between the pages. The navigation data may include identifiers for tabbed pages, tabbed subpages, the user navigating the application or website, the type of device or operating system, etc. The navigation data may include a path script or code executed to render a page of the application or website on the client device 101. In an embodiment, the navigation data is received separate from the event data. In another embodiment, the navigation data is sent with the event data.

At block 808, the navigation data is combined with the data relating to intervals of user attention determined in block 804. For example, time stamps may be used to sync the navigation data with the appropriate intervals of user attention. In some instances, the navigation data may be associated with a specific time within the intervals of user attention. The combining of the navigation data and the intervals of user attention may include generating a table indicating the intervals of user attention. The table may include, for example, the start time and the end time of the intervals of user attention. For each interval of user attention, the table may also include additional corresponding navigation data that coincides in time with the interval of user attention.

At block 810, the combined data may be stored or used for further processing or analysis. In an embodiment, blocks 806, 808, and 810 may be performed by the data combiner module 502 of FIG. 5. The data combiner module 502 may, for instance, send the combined data to the analytics module 503 or the quality assurance module 504 of FIG. 5 for various analyses to be performed.

Social Networking System—Example Implementation

Figure 9:
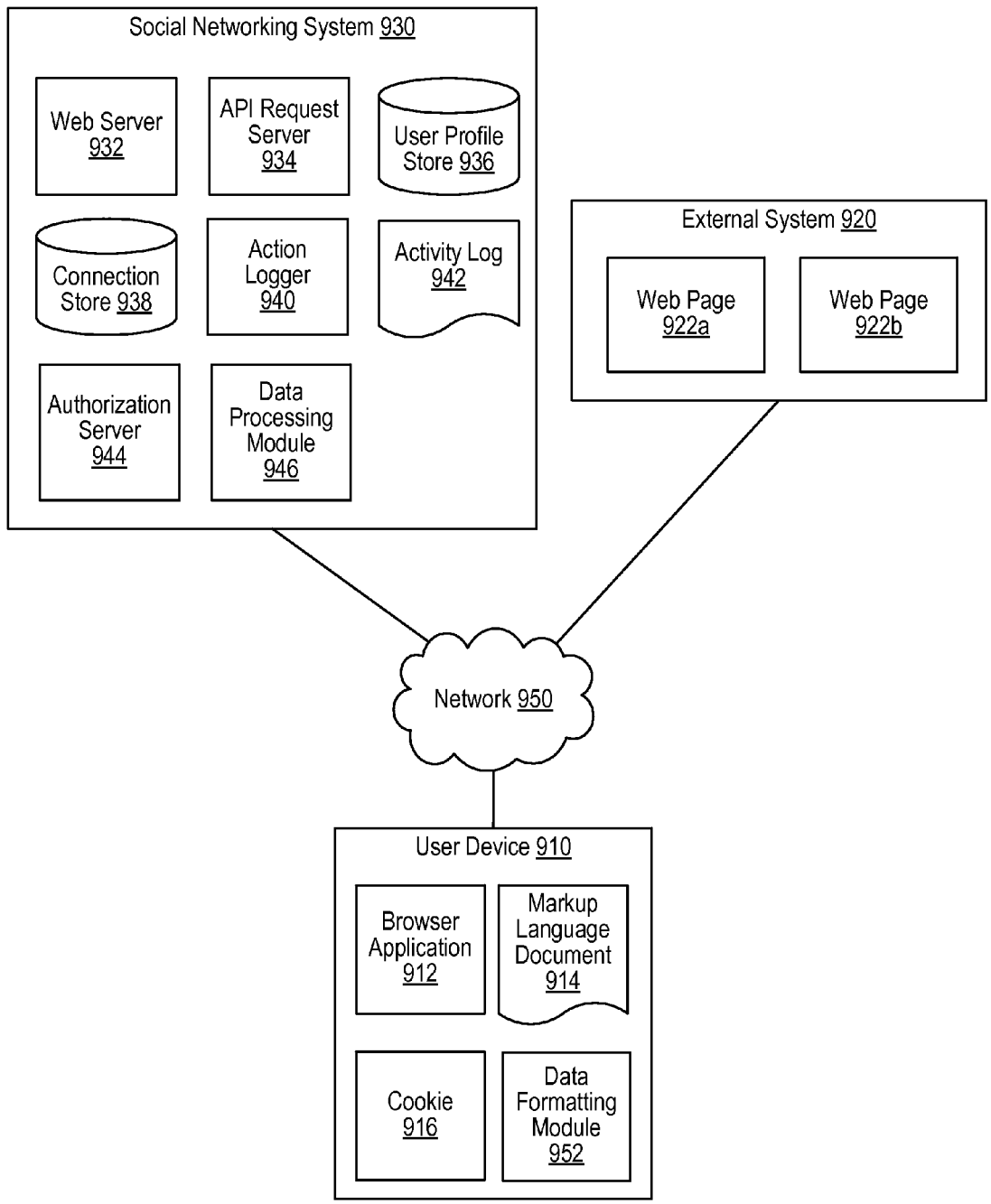
FIG. 9 illustrates a network diagram of a system for receiving and processing detected events within a social networking system, according to an embodiment.

FIG. 9 is a network diagram of an example system 900 for selecting potential meeting time and location pairs in response to a meeting request, in accordance with an embodiment of the invention. The system 900 includes one or more user devices 910, one or more external systems 920, a social networking system 930, and a network 950. In an embodiment, the meeting scheduling system 100 discussed herein may be implemented within the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID.

The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The user device 910 may also include a data formatting module 952 that generates event data including the bit array based on detected events. The data formatting module 952 may generate navigation data based on where the user navigates on the application or website via the user device 910. In an embodiment, the data shown in FIGS. 3 and 4 may be generated by the data formatting module 952 on the user device 910. In an embodiment, the user device 910 may be implemented as client device 101.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 939, an action logger 940, an activity log 942, an authorization server 944, and a video substitution module 946. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

According to an embodiment of the invention, the social networking system 930 may include a data processing module 946. In an embodiment, the data processing module 946 may be implemented as the data processing module 500. The data processing module 946, for example, may receive the event data and navigation data from the user device 910, as described in more detail herein. In an embodiment, the user device 910 may include a data formatting module 952. The data formatting module 952 may be implemented as the data formatting module 200. The data formatting module 952, for example, may generate the event data and the navigation data, as described in more detail herein.

Hardware Implementation

Figure 10:
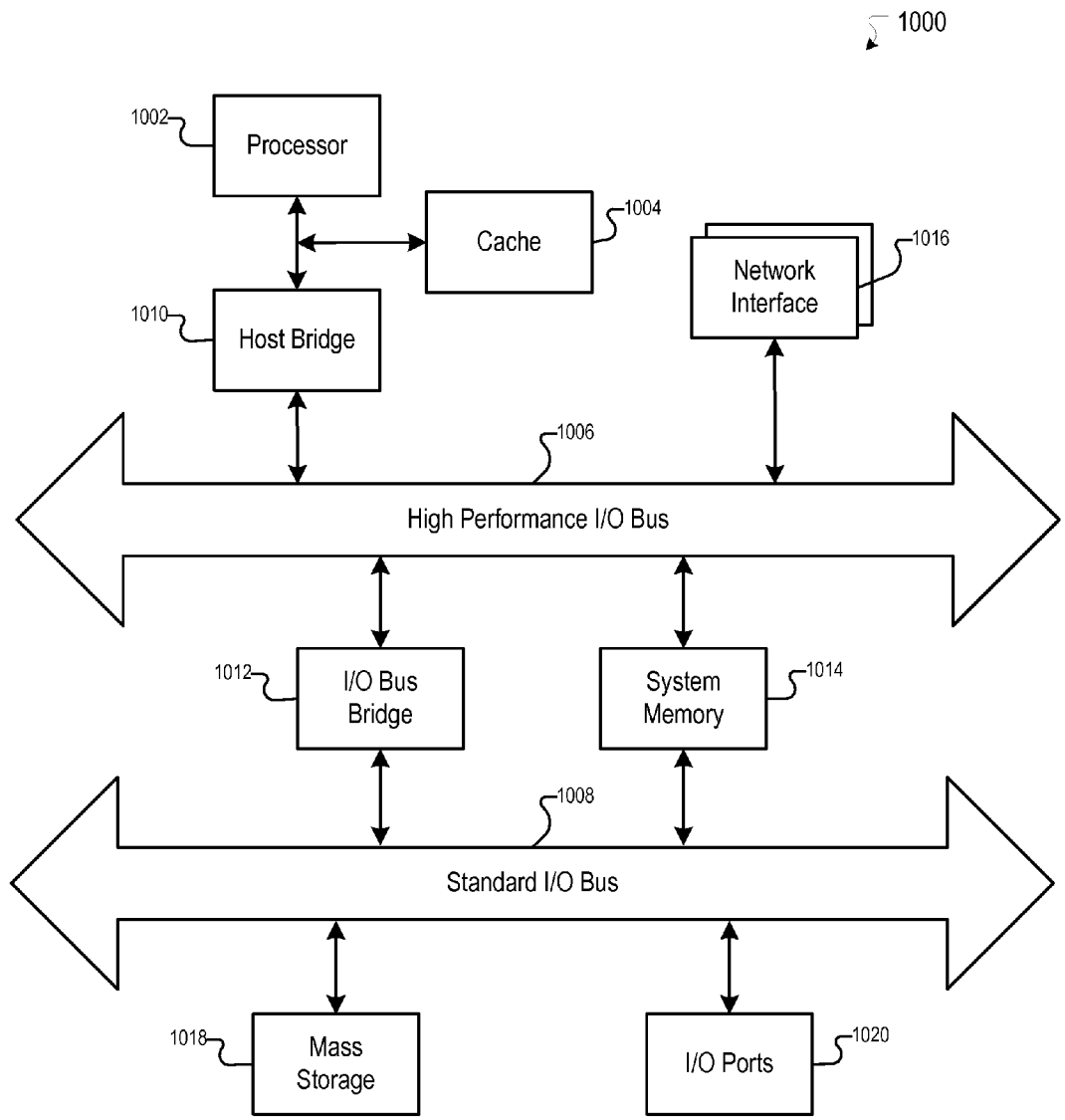
FIG. 10 illustrates an example of a computer system that may be used to implement one or more of the embodiments described herein, according to an embodiment.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 920, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
    receiving, by a computer system, a bit array from a device, wherein each bit value in the bit array indicates whether a user interacted with a website by performing an event;
    receiving, by the computer system, time information associated with the bit array, the information indicating a start time at which a first bit value in the bit array was determined, wherein each subsequent bit value in the bit array is determined at a predetermined time increment after the start time; and
    determining, by the computing system, a time interval that identifies an amount of time that the user interacted with the website based at least in part on the time information and the bit array.

2. The computer implemented method of claim 1, wherein the determining a time interval of user interaction comprises:
    determining that a predetermined time period after a time increment associated with the presence of a detected event is a part of the time interval of user interaction.

3. The computer implemented method of claim 2, wherein the part of the time interval of user interaction includes the one or more time increments associated with an absence of a detected event.

4. The computer implemented method of claim 2, wherein the predetermined time period is 30 seconds or less.

5. The computer implemented method of claim 1, wherein time increments of the bit array have equal values.

6. The computer implemented method of claim 1, further comprising:
    receiving navigation data from the device, wherein the navigation data comprises identifiers of one or more pages of the website accessed during time increments associated with the bit array.

7. The computer implemented method of claim 6, further comprising:
    determining a time interval of user interaction directed at the website based on the bit array; and
    associating the time interval of user interaction with the navigation data.

8. The computer implemented method of claim 7, wherein the associating the time interval of user interaction comprises:
    identifying a start time of the time interval of user interaction; and
    identifying an end time of the time interval of user interaction.

9. The computer implemented method of claim 7, wherein the associating the time interval of user interaction comprises:
identifying pages accessed during the time interval of user interaction.

10. The computer implemented method of 7, wherein the associating the time interval of user interaction comprises:
identifying a type of the device.

11. The computer implemented method of claim 6, wherein the navigation data comprises a first identifier of a first accessed page, a second identifier of a second accessed page, and a time associated with a navigation from the first accessed page to the second accessed page.

12. The computer implemented method of claim 6, wherein the navigation data comprises at least one of a page script or code executed to render a page on the device.

13. The computer implemented method of claim 1, wherein the event comprises a detected JavaScript event.

14. The computer implemented method of claim 1, wherein the event comprises at least one of a detected touch event applied to a touch screen and a detected event regarding content embedded in a page.

15. The computer implemented method of claim 1, further comprising receiving a data packet including the bit array and the start time, the data packet further including at least one of a sequence identifier, a cumulative time identifier, a length identifier, and an identifier of a user.

16. The computer implemented method of claim 1, wherein the device is a mobile device running an application of a social networking system.

17. The computer implemented method of claim 1, wherein the computer system includes a server associated with a social networking system.

18. A system comprising:
at least one processor; and
a memory storing instructions configured to instruct the at least one processor to perform:
receiving a bit array from a device, wherein each bit value in the bit array indicates whether a user interacted with a website by performing an event;
receiving time information associated with the bit array, the information indicating a start time at which a first bit value in the bit array was determined, wherein each subsequent bit value in the bit array is determined at a predetermined time increment after the start time; and
determining a time interval that identifies an amount of time that the user interacted with the website based at least in part on the time information and the bit array.

19. A non-transitory computer storage medium storing computer-executable instructions that, when executed, cause a computer system to perform a computer-implemented method comprising:
receiving a bit array from a device, wherein each bit value in the bit array indicates whether a user interacted with a website by performing an event;
receiving time information associated with the bit array, the information indicating a start time at which a first bit value in the bit array was determined, wherein each subsequent bit value in the bit array is determined at a predetermined time increment after the start time; and
determining a time interval that identifies an amount of time that the user interacted with the website based at least in part on the time information and the bit array.

* * * * *